United States Patent
Balasubramanian et al.

(10) Patent No.: US 7,400,889 B2
(45) Date of Patent: Jul. 15, 2008

(54) SCALABLE QUALITY BROADCAST SERVICE IN A MOBILE WIRELESS COMMUNICATION NETWORK

(75) Inventors: Srinivasan Balasubramanian, San Diego, CA (US); Irfan Khan, San Diego, CA (US)

(73) Assignee: Telefonaktiebolaget LM Ericsson (publ) (SE)

( * ) Notice: Subject to any disclaimer, the term of this patent is extended or adjusted under 35 U.S.C. 154(b) by 504 days.

(21) Appl. No.: 10/814,098

(22) Filed: Mar. 31, 2004

(65) Prior Publication Data

US 2004/0198371 A1   Oct. 7, 2004

Related U.S. Application Data

(60) Provisional application No. 60/459,397, filed on Apr. 1, 2003.

(51) Int. Cl.
*H04Q 7/20* (2006.01)
(52) U.S. Cl. ............... 455/452.2; 455/452.1; 455/453; 455/450
(58) Field of Classification Search ............. 455/452.2, 455/452.1, 453, 450, 451, 422.1, 405
See application file for complete search history.

(56) References Cited

U.S. PATENT DOCUMENTS

| | | | | |
|---|---|---|---|---|
| 5,915,214 A | * | 6/1999 | Reece et al. ................ | 455/406 |
| 6,853,675 B1 | * | 2/2005 | Oleynik ...................... | 375/130 |
| 2002/0095636 A1 | * | 7/2002 | Tatsumi et al. ............. | 714/748 |
| 2002/0144251 A1 | * | 10/2002 | Cho ........................... | 717/168 |
| 2002/0152319 A1 | * | 10/2002 | Amin et al. ................. | 709/232 |
| 2003/0179738 A1 | * | 9/2003 | Diachina et al. ............ | 370/349 |
| 2004/0106423 A1 | * | 6/2004 | McGowan et al. .......... | 455/522 |

OTHER PUBLICATIONS

McCanne, S., Jacobson, V., and Vetterli, M., "Receiver-driven Layered Multicast," ACM SIGCOMM '96, Aug. 1996, Stanford, CA.
Wu, L., Sharma, R., and Smith, B., "Thin Streams: An Architecture for Multicasting Layered Video," Department of Computer Science, Cornell University, Ithaca, New York, Publication date unknown.
Lee, S., Lee, D., and Yoon, W., "A Rate Adaptation Scheme for Layered Multicast using MSS in Mobile Networks," Collaborative Distributed Systems & Networks Laboratory, Information and Communications Univ., Korea, Publ. date unknown.

(Continued)

*Primary Examiner*—Joseph Feild
*Assistant Examiner*—Huy D Nguyen
(74) *Attorney, Agent, or Firm*—Coats & Bennett, P.L.L.C.

(57) ABSTRACT

The quality of a broadcast stream is varied responsive to changes in the utilization of forward link air interface resources. The network monitors utilization of forward link air interface resources and dynamically changes the forward link air interface resources dedicated to the broadcast stream responsive to changes in the utilization of forward link air interface resources. The quality of the broadcast stream is scaled to the allocated forward link resources. The broadcast stream may include a layered content and scaling can be achieved by varying the number of layers transmitted over the air interface. The network may notify mobile stations in advance when changes in the quality of the broadcast will take place. When the broadcast stream originates with a mobile station, the forward link air interface resources may be limited by the quality of the broadcast stream transmitted over a reverse link channel from the originating mobile station.

11 Claims, 4 Drawing Sheets

OTHER PUBLICATIONS

Seckin, G., and Brooks, R., "Challenges of Wireless Media Streaming," Publication date unknown.

Zeng, W., and Wen, J., "3G Wireless Multimedia: Technologies and Practical Issues," to appear in IEEE Inter. Conf. Image Processing, Special Session on Wireless Imaging, Sep. 2002, Rochester, NY.

Zhu, L., Ansari, N., Sahinoglu, Z., Vetro, A., and Sun, H., "Scalable Layered Multicast with Explicit Congestion Notification," MERL—A Mitsubishi Electric Research Laboratory, Apr. 2003.

Srinivas, B.S., Chaskar, H., and Trossen, D., "QoS enabled Layered Multicast Transmission of Multimedia Data in a Wireless Environment," Nokia, Inc., Burlington, MA, Publication date unknown.

Gorinsky, S., and Vin, H., "The Utility of Feedback in Layered Multicast Congestion Control," NOSSDAV'01, Jun. 25-26, 2001, Port Jefferson, New York, Copyright 2001.

Apostolopoulos, J., Tan, W., and Wee, S., "Video Streaming: Concepts, Algorithms, and Systems," Publication date unknown.

"Packet Switched Streaming Service White Paper," TeliaSonera Finland MediaLab, Nov. 19, 2003.

Tan, W., and Zakhor, A., "Real-Time Internet Video Using Error Resilient Scalable Compression and TCP-Friendly Transport Protocol," IEEE Transactions on Multimedia, vol. 1, No. 2, Jun. 1999, pp. 172-186.

Kim, T., and Ammar, M., "A Comparison of Layering and Stream Replication Video Multicast Schemes," NOSSDAV'-1, Jun. 25-26, 2001, Port Jefferson, New York, Copyright 2001.

Liu, J., and Li, B., "Adaptive Video Multicast over the Internet," IEEE Multimedia Jan.-Mar. 2003, pp. 22-33.

Krishnappa, R., "Image Compression Techniques and Video Streaming for Wireless Multimedia Communication," Illinois Institute of Technology—ECE512, Jul. 2003.

Horn, U., Keller, R., and Niebert, N., "Interactive mobile streaming services—the convergence of broadcast and mobile communication," EBU Technical Review, Autumn 1999.

"1xEV-DO and the Implications on Video Services," Copyright 2003, Qualcomm Incorporated, web paper.

"Overview of the MPEG-4 Standard," ISO/IEC JTC1/SC29/WG11 N4688, Mar. 2002.

"Overview of the MPEG-4 Standard" ISO/IEC JT1/SC29/2H11 N3747, Oct. 2000, pp. 1-60, XP000925987.

* cited by examiner

SCALABLE QUALITY BROADCAST SERVICE IN A MOBILE WIRELESS COMMUNICATION NETWORK

RELATED APPLICATIONS

This application claims priority under 35 U.S.C. § 119 from the following provisional application: Application Ser. No. 60/459,397 filed Apr. 1, 2003.

BACKGROUND OF THE INVENTION

With the introduction of third generation (3G) wireless communication networks, delivery of video services to mobile subscribers is now possible. Video has proven to be an effective medium for entertainment and education, and communications. Video services delivered over wireless communications networks will greatly enrich the communications capabilities of mobile subscribers, and will open up new market opportunities for content providers. Multimedia and video streaming services will allow content providers to deliver video to mobile subscribers wherever they happen to be. For example, a mobile subscriber waiting in an airport lobby for a flight will be able to receive live broadcasts of programming such as sporting events, news, or other programs, rather than simply get updates via text-based services. Additionally, mobile subscribers will have access to video on demand (VOD) programming. Videoconferencing is another service that will enhance the communications capabilities of mobile subscribers.

Because transmission of video consumes significant air interface capacity, contention for the available air interface resources between voice users and multimedia users is likely to occur during peak periods. Service providers need some flexibility in balancing the needs of voice users and multimedia users. One solution is to simply allocate a fixed amount of air interface resources for voice and multimedia users respectively. However, fixed allocations of resources are inefficient from a spectrum utilization standpoint. If the number of voice users is small, resources allocated to the voice users will be underutilized. Increases in system capacity can be achieved by dynamically allocating unused resources to multimedia users when the number of voice users is small. Problems may still arise when the aggregate demands of the voice and multimedia users exceed the available resources for providing such services. During periods of network congestion, admission control algorithms will block some users from receiving service. Service providers may charge some users an extra fee to have preferential access during peak periods. However, there will always be some users who are dissatisfied.

SUMMARY OF THE INVENTION

The present invention provides a method and system to dynamically reassign air interface resources in a mobile wireless communication network responsive to variations in demand and to scale the quality of a broadcast stream to the resources dedicated to a broadcast stream. Various techniques for adapting the quality of the broadcast stream may be used. In a preferred embodiment of the invention, a layered encoding algorithm is used in conjunction with a layered transmission scheme to adapt the quality of a broadcast stream responsive to varying demands. The content of each broadcast stream, which may comprise video, audio or other multimedia content, is encoded into multiple layers including a base layer and one or more enhancement layers that can be successively combined to provide progressive refinements in quality. The base layer contains the data representing the most important features of the video. Additional enhancement layers contain data that progressively refine the video. The network has the ability to selectively change the number of layers in a broadcast stream and hence the quality of the broadcast stream at various points in the network responsive to changes in resource utilization. Reducing the number of layers in a broadcast stream lowers the bandwidth requirements of the stream to reduce air interface resources required to support the broadcast stream.

In another aspect of the present invention, the network provides an explicit notification to the mobile stations when changing the quality of the broadcast stream to avoid service disruption and to enable smooth transitions between changes. The network may send a message to the mobile station indicating changes in the quality of the broadcast stream and/or the resources used to deliver the broadcast stream. The message may include an action time parameter indicating in advance the time when the changes will be effective.

DETAILED DESCRIPTION OF THE INVENTION

Figure 1:
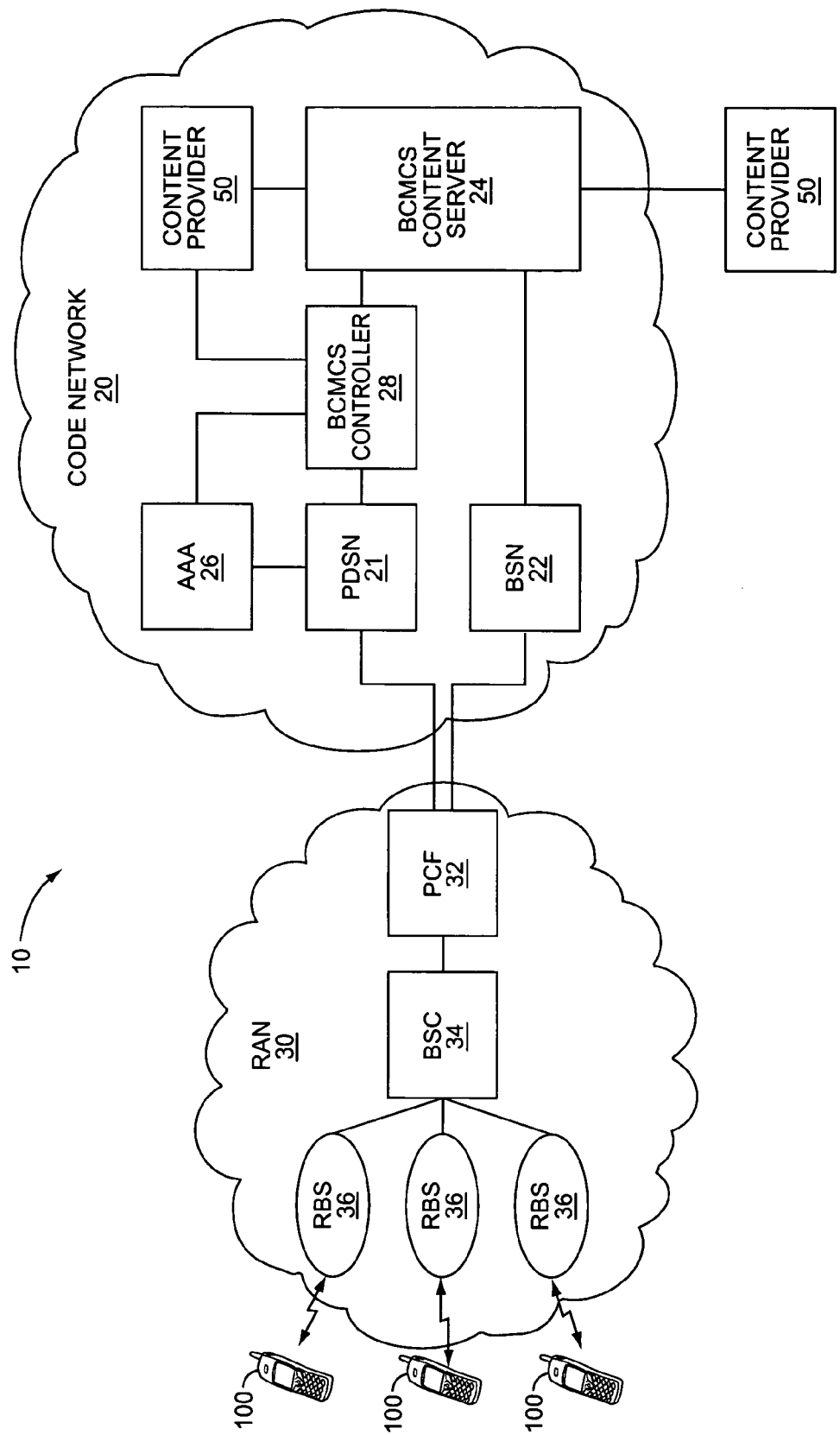
FIG. 1 is block diagram illustrating the functional entities in an exemplary mobile wireless communication network.

FIG. 1 illustrates an exemplary wireless network 10 for providing broadcast/multicast services (BCMCS) to a mobile subscriber. The wireless network 10 may be any type of wireless network, such as a CDMA network, WCDMA network, GSM/GPRS network, EDGE network, or UMTS network. FIG. 1 illustrates a network 10 configured according to the cdma2000 standards. Wireless network 10 comprises a core network 20 and a radio access network (RAN) 30. The core network 20 connects to one or more external networks, such as the Internet and other wireless communication networks. The RAN 30 connects to the core network 20 and serves as the access point for mobile stations 100.

The core network 20 includes a Packet Data Serving Node (PDSN) 21 a Broadcast Serving Node (BSN) 22, a BCMCS Controller 23, a BCMCS Content Server (BCMCS-CS) 24, and an authentication, authorization and accounting server (AAA) 26. The PDSN 21 connects to an external packet data network (PDN), such as the Internet, and supports PPP connections to and from the mobile stations. It adds and removes IP flows to and from the RAN 30 and routes packets between the external packet data network and the RAN 30. The BSN 22 connects to the BCMCS-CS 24 and supports BCMCS flows to and from the mobile stations. It adds and removes BCMCS flows to and from the RAN 30. The BSN also processes BCMCS flows for bit-rate adaptation as hereinafter described. The functions of the BSN 22 may be incorporated into the PDSN 21 if desired. The BCMCS controller 23 is responsible for managing and providing BCMCS session information to the BSN 22, BCMCS-CS 24, RAN 30, and the mobile stations 100. The BCMCS-CS 24 is the logical entity that makes BCMCS content available to mobile stations. The BCMCS-CS 24 is not necessarily the source of the content but may receive the content from external content providers. The content provider 50 may be a server within the serving network, in a mobile station's home network, or in an external PDN such as the Internet. It may store and forward content from the content provider, or may merge content from multiple content providers. If encryption is used, the BCMCS-CS 24 may encrypt the stream content. The AAA 26 is responsible for authentication, authorization and accounting functions. It accesses a Subscriber Profile Database (not shown) to obtain information from a user's subscription profile, and may send the user subscription profile to the BCMC-CS 24.

The RAN 30 includes a Packet Control Function (PCF) 32, a Base Station Controller 32 a and one or more radio base stations (RBSs) 36. The primary function of the PCF 32 is to establish, maintain, and terminate connections to the PDSN 21. The BSCs 34 control the radio resources within their respective domains. A BSC 34 can manage several RBSs 36. The RBSs 36 provide the air interface for communicating with mobile subscribers. An exemplary air interface specification for providing BCMCS services is described in the Third Generation Partnership Project 2 (3GPP2) specification titled *CDMA High Rate Broadcast-Multicast Packet Data Air Interface Specification*, Version 1.0 (February 2004) (the *BCMCS Air Interface Specification*), which is incorporated herein by reference.

Figure 2:
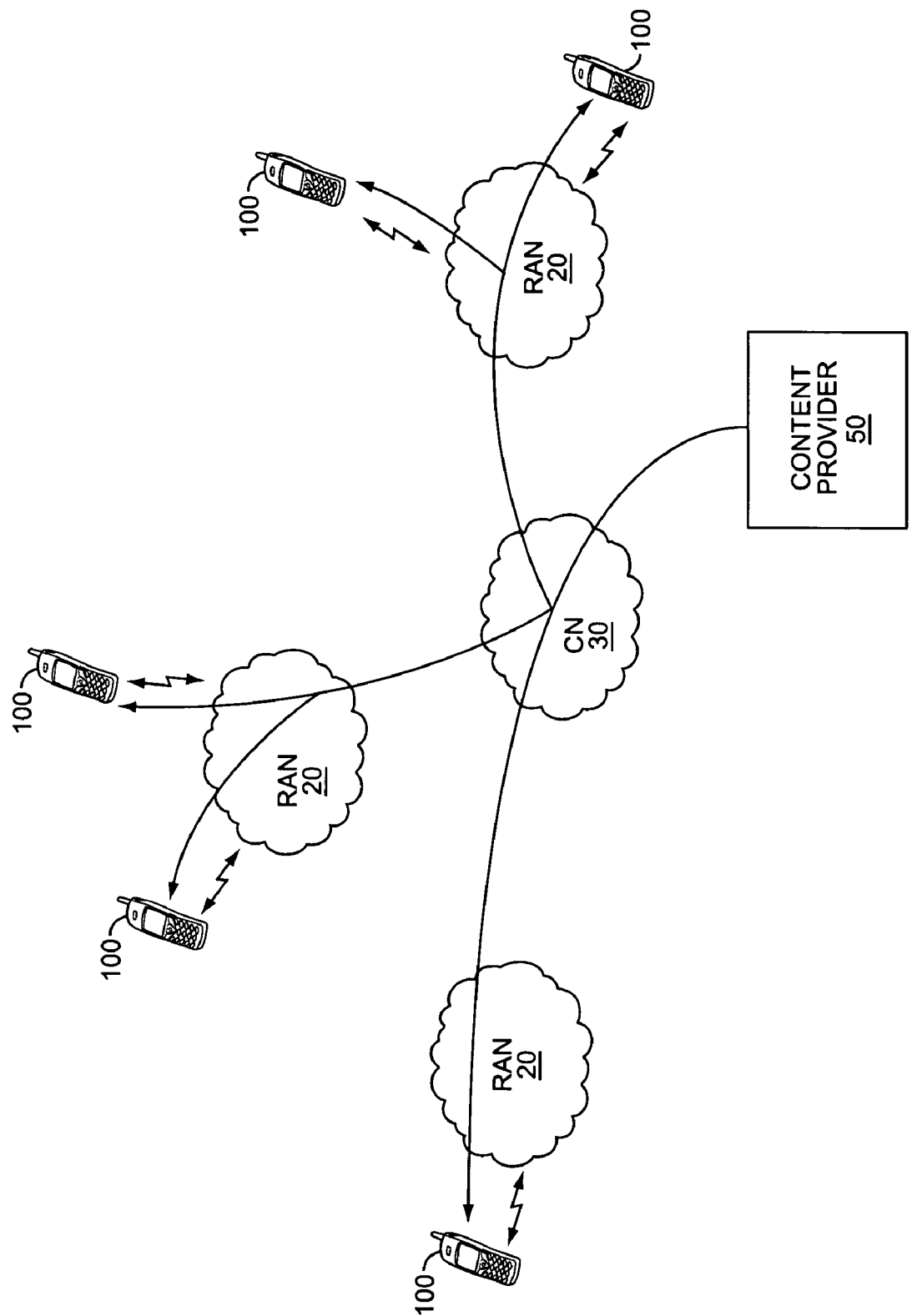
FIG. 2 is a schematic diagram illustrating a video streaming session.
Figure 3:
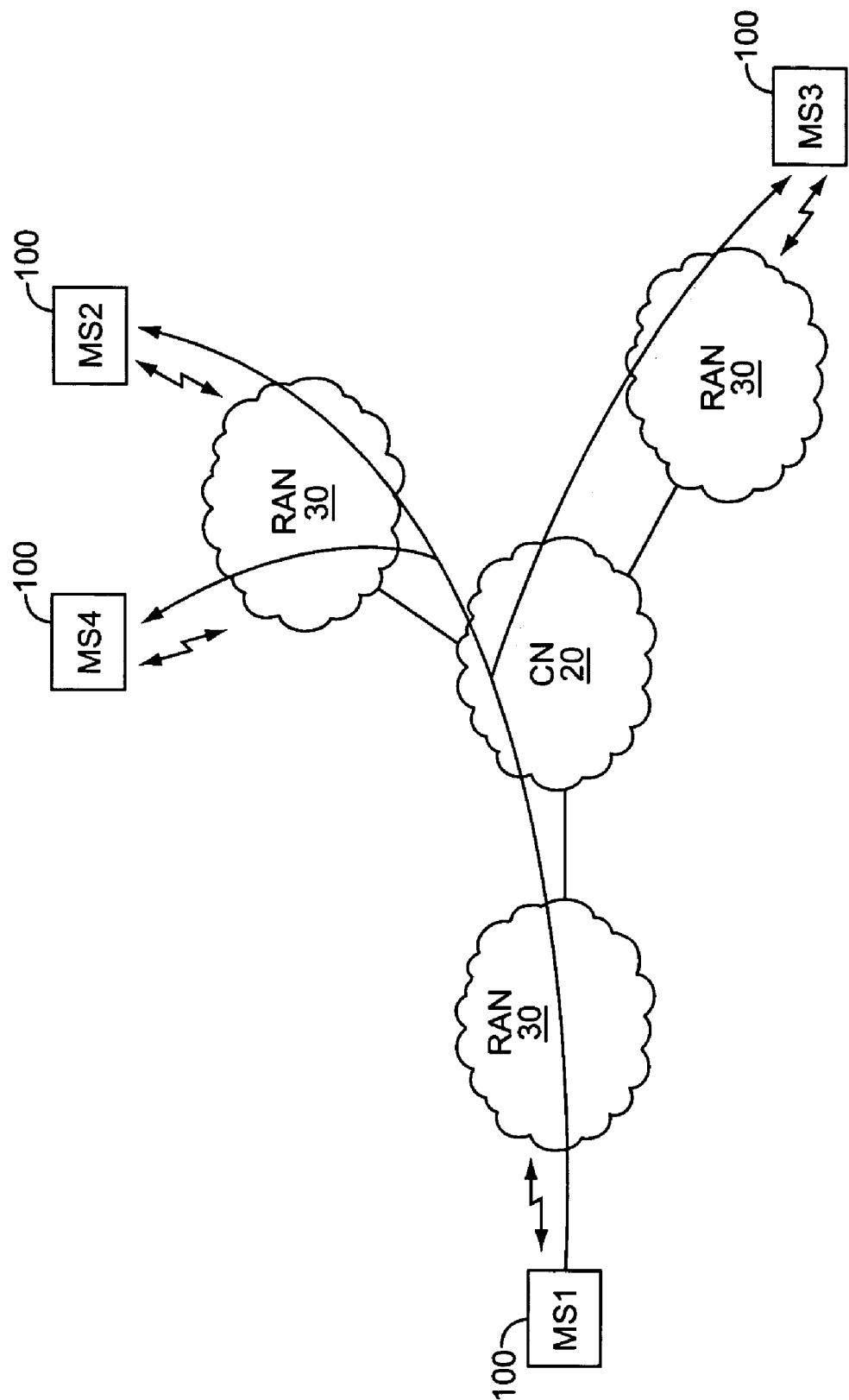
FIG. 3 is a schematic diagram illustrating a videoconferencing session.

BCMCS services provide the ability to transmit the same information stream, referred to herein as a BCMCS stream, to multiple users simultaneously. BCMCS services may be used for video streaming applications and to provide videoconferencing capabilities to mobile stations 100. Typical video streaming applications include live broadcasts and video on demand (VOD). FIGS. 2 and 3 illustrate two applications.

In FIG. 2, a BCMCS stream flows from the BCMCS-CS 24 to a number of mobile stations 100, which may be in different sectors of the networks. A content provider 50 residing in either the core network 20 or in a PDN generates the content of the BCMCS stream, which may comprise a real-time broadcast or a stored broadcast program. The content is in digital form. If the content provider is outside the network, the content provider packetizes the content for delivery over the IP network to the BCMCS-CS 24 in the core network 20, which makes the content available to mobile stations within the wireless communication network. The BCMCS stream is duplicated at branching points within the network 10 to make the stream available to different sectors. One or more RBSs 36 broadcast the BCMCS stream to the mobile stations 100 over a forward broadcast channel.

In FIG. 3, four mobile stations 100 (MSs 1-4) are engaged in a videoconference. A BCMCS stream from one mobile station 100 (MS 1) is shown, however, those skilled in the art will appreciate that similar BCMCS streams originate from each of the mobile stations 100. The originating mobile station 100 (MS 1) transmits the BCMCS stream over reverse link broadcast channel to a serving RBS 36. The network 10 routes the BCMCS stream to one or more terminating RANs 30, which broadcast the BCMCS stream over a forward broadcast channel to the terminating mobile stations 100 (MSs 2-4). FIG. 3 illustrates three terminating mobile stations 100 (MSs 2-4) in two different RANS 30.

Reception of a BCMCS service is enabled by a number of procedures that are described in the 3GPP2 specification titled *Broadcast and Multicast Services Framework X.P0019, Rev. 0.1.4* (Mar. 15, 2004) (*Framework*). The basic procedures include service discovery/announcement, content subscription, content information acquisition, content availability determination, BCMCS registration, reception of content, and BCMCS deregistration. The network 10 provides one or more mechanisms to enable users to request or be informed about BCMCS services available. The BCMCS-CS 24 may act as a server in communication with a client application in a mobile station 100. The client application may request BCMCS service information from the BCMCS-CS 24, or the BCMCS-CS 24 may send unsolicited announcements about BCMCS services. Other service discovery/announcement mechanisms include announcements via SMS and WAP. Whatever mechanism is used for service discovery/announcement, the information concerning BCMCS content and schedule is provided to the mobile stations 100. The service discovery/announcement mechanism provides basic information about the service required for information acquisition, such as the content name and start time.

The user subscribes to BCMCS content and selects the content that he wants to receive. Content subscription may be performed either before or after service discovery/announcement. User subscription information is stored in a subscriber profile. To receive selected content, the mobile station 100 communicates with the BCMCS controller 23 to acquire session information associated with a selected BCMCS content. This process is known as content information acquisition. The session information includes such information such as a BCMCS flow identifier that identifies a BCMCS stream, flow treatment, e.g., header compression and/or header removal, and the transport and application protocols used.

The content availability determination procedure enables the mobile station 100 to determine the availability of a particular BCMCS stream. The serving RBS 36 may transmit content availability information to the MS in overhead messages. If the mobile station 100 cannot find the content availability information from the overhead messages, the mobile station 100 may request the desired BCMCS stream by making a BCMCS registration request.

The BCMCS registration procedure is used by the mobile station 100 to request delivery of a BCMCS stream. The BCMCS registration request is sent by the mobile station 100 to the serving RBS 36. If a bearer path between the BCMCS-CS 24 and the RBS 36 is not established, the RBS 36 in cooperation with the BCMCS-CS 24 will establish a bearer path. Once the mobile station 100 begins receiving the BCMCS stream, the RBS 36 may require the mobile station 100 to periodically reregister. Periodic registration allows the RBS 36 to stop broadcasting a BCMCS stream when there are no mobile stations 100 receiving the stream.

The mobile station 100 may perform a BCMCS deregistration procedure to notify the RBS 36 that the mobile station 100 is no longer monitoring the BCMCS stream. Deregistration may also occur via time out at the RBS 36 if the deregistration timer for the mobile station 100 expires.

The BCH for transmitting a BCMCS stream over the air interface may be a shared channel or a dedicated channel. The BCH, in general, will have a forward link but no reverse link. In cdma2000 systems, the broadcast channel may comprise one or more forward supplemental channels (F-SCH). Also, the BCH could be carried over a shared packet data channel, such as the forward packet data channel F-PDCH in cdma2000. The BCH carries packets containing the BCMCS content generated by the BCMCS-CS. The BCH can also carry forward-link signaling messages. Each BCMCS stream is associated with an identifier. As will be described in greater detail below, a BCMCS stream may comprises one or more substreams.

The BCMCS stream is transmitted to the mobile station over a forward broadcast channel (F-BCH). The BCH may comprise several subchannels referred to herein as Broadcast Logical Channels. A BCMCS stream is carried on one Broadcast Logical Channel. Each Broadcast Logical Channel may carry one or more BCMCS streams. In order for a mobile station to discover and monitor broadcast content successfully, various broadcast-related parameters need to be sent to the mobile receiver over the air interface. The network broadcasts these parameters over the BCH in the form of a broadcast overhead message. The broadcast overhead message contains the logical-to-physical channel mapping and other parameters for each BCMCS flow to enable the mobile stations to successfully receive the BCMS flow.

Because video and multimedia streams consume substantial resources, the present invention provides a mechanism to dynamically reassign air interface resources responsive to variations in demand and to scale the quality of a BCMCS to the resources dedicated to a BCMCS stream. For example, when the demands exceed the capacity of available resources, a resource management entity in the network may reduce the air interface resources dedicated to a given BCMCS stream. In this case, the quality of the BCMCS stream is reduced to fit the BCMCS stream into the reduced air interface resources. Conversely, when the air interface resources are underutilized, the resource management entity may increase the air interface resources dedicated to the BCMCS stream. In this case, the quality of the BCMCS stream is enhanced to provide a higher QoS to recipients of the BCMCS stream.

Various techniques for adapting the quality of the BCMCS stream may be used. For example, the source encoding of the broadcast stream could be changed to reduce the data rate. In a preferred embodiment of the invention, a layered encoding algorithm is used in conjunction with a layered transmission scheme to adapt the quality of a BCMCS stream responsive to varying demands. The content of each BCMCS stream, which may comprise video, audio other multimedia content, is encoded into multiple layers including a base layer and one or more enhancement layers that can be successively combined to provide progressive refinements in quality. For example, the MPEG-2, MPEG-4 and H.263 standards for video compression and transmission support layered coding of video. The base layer contains the data representing the most important features of the video. Additional enhancement layers contain data that progressively refine the video. MPEG-2 and H.263 standards, for example, support cumulative layered encoding of video with four scalability modes: spatial scalability, temporal scalability, SNR scalability, and data portioning. A combination of these scalability modes leads to hybrid scalability consisting of a large number of layers. The network has the ability to selectively change the number of layers in a BCMCS stream and hence the quality of the BCMCS stream at various points in the network responsive to changes in resource utilization. Reducing the number of layers in a BCMCS stream lowers the bandwidth requirements of the stream to reduce air interface resources required to support the BCMCS stream.

Figure 4:
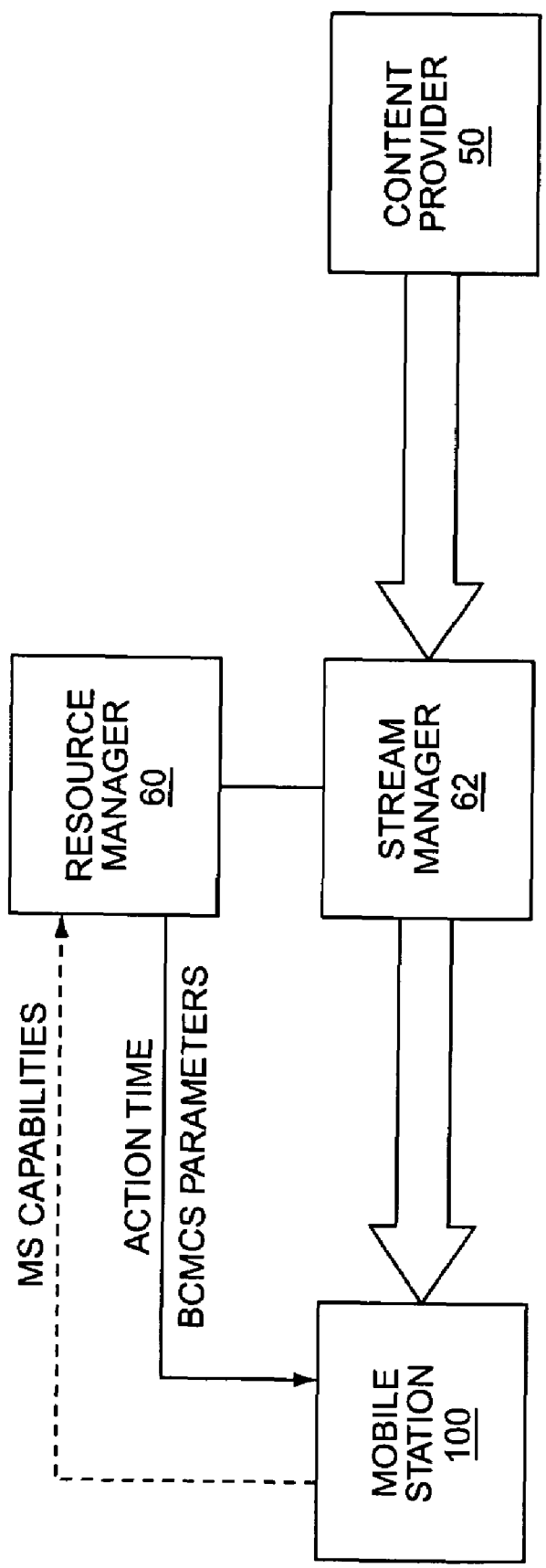
FIG. 4 is a block diagram illustrating the functional entities for dynamically scaling the quality of a multimedia stream.

FIG. 4 illustrates logical network elements for adapting the bandwidth requirements of a BCMCS stream in one exemplary embodiment of the invention. A resource manager 60 monitors resource utilization and determines the resources to be allocated for a given BCMCS stream. The stream manager 62 receives layered content from the BCMCS-CS 24 and adapts the layered content to the allocated resources responsive to the resource manager 60. In one embodiment, the content is encoded with a layered encoding algorithm. The resource manager 60 determines either the number of layers or bit rate that can be accommodated by the resources allocated to that stream. The stream manager 62 generates a BCMCS stream with a quality adapted to the allocated resources for the broadcast stream responsive to the resource manager 60. The stream manager 62 in effect acts as a governor to throttle the BCMCS stream flowing from the BCMC-CS 24 to the mobile stations 100 during periods of congestion. The BCMCS-CS 24 in a preferred embodiment transmits all layers to the stream manager, which pairs the layers responsive to the resource manager 60.

Numerous techniques may be used to vary the layers in a BCMCS stream carrying layered content. In one approach, referred to herein as the packet filtering approach, the BCMCS-CS 24 provides a single BCMCS stream containing multiple layers to the stream manager 62. The BCMCS stream is encoded using a layered coding algorithm. Packets corresponding to the different layers are identified by information contained in the packet headers. The stream manager 62 includes a packet filter that filters the packets in the BCMCS stream and drops those packets that are not being transmitted over the air interface.

In another approach, referred to herein as the multiple thin stream approach, the BCMCS stream is divided into multiple "thin" streams corresponding to the different encoding layers. Each layer is transmitted as a separate substream from the BCMCS-CS 24 to the stream manager 62. Each substream is associated with the same BCMCS flow identifier. The stream manager 62 selects the layers to be delivered to the mobile stations 100 over the air interface and discards the layers that are not selected. The selected layers may preferably be combined by the stream manager 62 before transmission over the air interface. This approach reduces the computational demands on the mobile station. Alternatively, the selected layers may be transmitted separately and combined at the mobile station 100.

In a third approach, referred to herein as the group approach, multiple BCMCS streams are transmitted from the BCMCS-CS to the stream manager 62. Each stream carries the same content but has different numbers of encoding layers. For example, one stream may comprise only the base layer, a second stream may comprise the base layer and a first enhancement layer, and a third stream may comprise the base layer and two enhancement layers. Thus, each stream corresponds to a different grouping of layers and is therefore referred to herein as a group. The groups may be associated with the same BCMCS flow identifier. An additional identifier may be required to identify the individual groups. Depending on the resources allocated for a particular BCMCS stream, the stream manager 62 selects the group with the highest quality that can be accommodated by the resources allocated for the BCMCS stream. The selected group is transmitted over the air interface to the mobile stations 100.

In one variation of the group approach, multiple groups may be transmitted to the mobile stations 100 over the air interface simultaneously. The mobile stations 100 can independently select the group to receive, depending on the mobile station's capabilities and service profile. Each group can be encrypted and require a different subscription that can be stored in the user's subscription profile. All groups are transmitted when the resources are available. The resource manager 60 can dynamically add and remove groups being transmitted over the air interface, depending on the availability of air interface resources.

Other factors in addition to network conditions may be considered when adapting the quality of the BCMCS stream. For example, the network may use knowledge of the capabilities of the mobile stations to avoid transmission of content that cannot be received by any mobile stations 100. If there is no mobile station 100 capable of receiving and processing more than three layers, for example, it is a waste of resources to transmit more than three layers over the air interface.

Feedback of mobile station capabilities to the resource manager 60 is shown by the dotted line in FIG. 4.

The resource manager 60 may reside at a single node within the network, or may be distributed among two or more nodes. In one exemplary embodiment, the resource manager 60 resides in the BSC and implements dynamic quality scaling on a sector-by-sector basis. A stream manager 62 could be located at each RBS 36 or at the BSC 34 in the RAN 30. Locating the stream manager 62 at the BSC 34 or RBS 36 provides the greatest flexibility in responding to local changes in resource utilization and would not require any changes in the core network. Alternatively, the stream manager 62 could be located at the BSN 22 in the core network 20, or integrated with the BCMCS-CS server 24.

The resource manager 60 monitors resource utilization by various services, such as voice, packet data and broadcast services, and determines how the available radio resources should be allocated. The resource manager 60 dynamically changes the allocation of those resources depending on resource utilization. If a sector begins to experience congestion, the resource manager 60 may reallocate resources being used for BCMCS services to voice services or other services. Conversely, if a sector is lightly loaded, the resource manager 60 may allocate unused resources to BCMCS services to improve QoS.

The resources managed will depend on the type of channels used to deliver broadcast services. For forward link communications in a CDMA network, the resource manager 60 can manage two types of resources depending on the type of channel being used to deliver services—1) Walsh codes and power for dedicated channels, and 2) time slots and power for shared channels. Based on the bandwidth required for a BCMCS stream, the resource manager 60 determines what specific resources to allocate to the BCMCS stream and determines the number of layers that can be accommodated by the allocated resources. The stream manager 62 is responsive to the resource manager 60 to vary the quality of the BCMCS stream accordingly.

In a preferred embodiment of the invention, the resource manager 60 measures the use of a limited resource such as the power or available Walsh codes. The resource manager 60 can measure the amount of the resource that is currently being used, or that is currently available. For example, if the resource monitored is power, the resource manager 60 can monitor the total power used by each service and the total power used by all services. The resource manager may compare the power measurements to predetermined thresholds that indicate congestion or underutilization. Based on the comparisons with the predetermined thresholds, the resources manager may reallocate air interface resources to reduce the amount of the resources consumed by BCMCS. As described above, the quality of the BCMCS stream can be adjusted through use of a layered encoding algorithm.

The resource manager 60 may use filtered loading indicators to adapt the broadcast channel. Because resource utilization may change rapidly in a mobile communications system, the metric used to determine allocation of resources for BCMCS may be filtered to adjust the responsiveness of the resource manager 60 to changing conditions. It would not be desirable for example to make changes in the content of a broadcast too rapidly, because frequent changes would increase the overhead required to implement the changes. Further, too frequent changes in the quality of the broadcast would be disturbing to subscribers.

In another aspect of the present invention, the network provides an explicit notification to the mobile stations 100 when changing the quality of the BCMCS stream to avoid service disruption and to enable smooth transitions between changes. The mobile station 100 may be informed of the possible operating modes associated with the BCMCS stream. The mobile station may acquire this information, for example, during content information acquisition or during registration to receive a BCMCS stream. Each operating mode corresponds to a set of BCMCS session parameters that define the encoding and other parameters needed by the mobile station 100 to successful receive and decode the BCMCS stream. Each operating mode has a mode identifier that that uniquely identifies the operating mode.

According to the present invention, notification of changes in the BCMCS stream is given by transmitting new session parameters including the mode identifier to the mobile station 100. The session parameters including the mode identifier may be transmitted as part of a Broadcast Service Parameters Message (BSPM) over a paging channel (PCH) or a broadcast control channel (BCCH). The BSPM is a broadcast control message that enables the network to specify the session parameters associated with a BCMCS stream. The session parameters may also specify a new Logical to Physical Mapping (LPM) associated with the BCMCS stream.

According to one embodiment of the present invention, two new parameters are added to the BSPM: the Use Time parameter and the Action Time parameter. The Use Time parameter is a one-bit indicator that notifies the mobile station 100 that a change in the session parameters associated with the BCMCS stream is pending. The Action Time parameter notifies the mobile station 100 exactly when the change in the session parameters will be effective. The Use Time parameter is a single bit. When the Use Time parameter is set to "1" the mobile station 100 is directed to start using the new session parameters contained in the BSPM at the time specified in the Action Time parameter. The Action Time parameter is a 6-bit field that indicates the system time in units of 80 ms (modulo 64) when new parameters of the broadcast channel will become effective.

When a mobile station 100 receives a BSPM, the mobile station 100 compares the sequence number of the BSPM to that stored in memory to determine if the message has been previously received. If so, the message is ignored. If the BSPM is a new message, the mobile station 100 processes the remaining fields in the message. Any new BSPM parameters are stored in memory. If the Use Time parameter is set to "1," the mobile station continues to use the old BSPM parameters until the designated action time and then invokes the new parameters. The parameters of the BSPM may specify a new logical to physical channel mapping, and/or changes in the content of the BCMCS flow. For example, the BSPM could indicate to the mobile station 100 the encoding used for the broadcast and the number of layers.

In CDMA systems, a mobile station 100 in soft/softer handoff may receive the same information from two or more sectors. In order to combine information transmitted by two or more sectors, the mobile station 100 needs to receive the same information from both sectors. When a mobile station 100 receiving a BCMCS stream is in soft handoff, transmissions from the sectors that are being soft combined need to be coordinated. In addition to communicating the LPM and operating mode for a BCMCS stream, the network may also communicate to the mobile stations the soft handoff neighbors that can be combined. In this case, the mobile station 100 may be programmed to soft combine transmissions from only those sectors that are compatible.

There is a tradeoff between allowing mobile stations 100 to soft combine versus restricting changes in a BCMCS stream to only those sectors where the change is optimal. As a consequence, the mobile station 100 may not always be able to combine transmissions from adjacent sectors. For example, if one sector is lightly loaded and an adjacent sector is heavily loaded, the BCMCS stream may be transmitted with different encoding in each sector. In this case, the mobile station 100 will not be able to combine the BCMCS streams from the adjacent sectors. In many instances, some loss in the ability to soft combine BCMCS streams from different sectors may be tolerated. However, if the sectors are small and the mobile stations 100 are highly mobile, the loss of the ability to soft combine BCMCS streams from different sectors may be more significant. If the service provider considers the ability to soft combine important, the service provider may group sectors into larger broadcast zones. Each sector in a broadcast zone transmits an identical BCMCS stream, thereby preserving the ability to soft combine BCMCS streams from different sectors in the same broadcast zone. In this scenario, there may be a single resource manager 60 for each broadcast zone. If the broadcast zone corresponds to the set of sectors managed by a single BSC 34, the resource manager 60 could be conveniently located at the BSC 34. In other embodiments, the resource manager 60 could be located at a PCF 32 in the RAN 30 or at the BSN 22 in the core network 20. The resource manager 60 monitors resource utilization in all sectors within a broadcast zone and determines the operating mode of the BCMCS stream. In this scenario, the resource manager 60 selects the highest quality operating mode that can be accommodated by all of the sectors.

In the embodiments described thus far, it has been assumed that the BCMCS stream originates in a wireline network and terminates at a mobile station. In this scenario, the broadcast stream is transmitted over wireline networks from the content provider 50 to a RBS 36 and transmitted by the RBS 36 over the air interface to a mobile station 100. In some embodiments of the invention, the BCMCS stream may originate and terminate at a mobile station 100. One application where this scenario may arise is video conferencing as shown in FIG. 3 If two or more mobile stations 100 are engaged in a video conference, each mobile station 100 generates a BCMCS stream that is transmitted over a reverse link channel to the wireless communication network 10, routed by the network 10 to a RBS 36 serving the receiving mobile terminal 100, and transmitted over a forward link broadcast channel to a receiving mobile terminal 100. In this scenario, a resource manager 60 controls the resources for the forward link broadcast channel as previously described with some modifications described below to take into account the performance of the reverse link channel from the originating mobile station 100 to the network 10. More particularly, the resource manager 60 may take into account the performance of the reverse link from the originating mobile station 100 in provisioning the forward broadcast channel. There is no benefit in allocating resources for a BCMCS stream on the forward link that exceeds the capacity of the reverse link from the originating mobile station. By taking into account performance of the reverse link, over-provisioning of the forward link is avoided. Therefore, the resource manager 60 may limit the air interface resources allocated to a BCMCS stream based on the capacity of the reverse link from the originating mobile station 100.

On the reverse link, the constraining factor is interference among different users in the sector. The serving RBS 36 controls the transmit power level of the mobile station 100. Power control is typically performed by controlling the transmit power of the reverse pilot channel. The available transmit power is limited by the traffic-to-pilot ratio. A resource manager 60 controlling the reverse link channel from the originating mobile station 100 determines the number of layers that can be transmitted over the reverse link and reports the quality of the BCMCS stream received over the reverse link channel to the resource manager 60 controlling the forward link resources. As noted above, the reports from the reverse link resource manager 60 may be used by the forward link resource manager 60 to provision the forward link broadcast channel. Similarly, the resource manager 60 for the forward link broadcast channel may feed back information to the reverse link resource manager 60 to prevent over-provisioning the reverse link when the capacity of the reverse link channel exceeds the capacity of the forward link broadcast channel. Thus, the resource managers 60 for the reverse link channel and forward link broadcast channel may negotiate an appropriate configuration for the BCMCS stream that can be accommodated by both the forward link and reverse link broadcast channels.

What is claimed is:

1. A method of providing broadcast services in a wireless communication network, comprising:
   (a) transmitting a broadcast stream originating at a content provider to one or more mobile stations over a forward link broadcast channel;
   (b) monitoring utilization of forward link air interface resources; and
   (c) dynamically adjusting the forward link air interface resources allocated to the broadcast stream responsive to changes in the utilization of forward link air interface resources;
   (d) scaling the quality of the broadcast stream responsive to adjustments to the allocated forward link air interface resources; and
   (e) transmitting broadcast service parameters to the mobile stations to indicate the forward link air interface resources dedicated to the broadcast stream, wherein the broadcast service parameters indicate the scaling applied to the broadcast stream transmitted over the air interface.

2. The method of claim 1 wherein the broadcast service parameters transmitted to the mobile stations include a mode identifier that identifies a set of broadcast service parameters for the broadcast stream.

3. A method of providing broadcast services in a wireless communication network, comprising:
   (a) transmitting a broadcast stream originating at a content provider to one or more mobile stations over a forward link broadcast channel;
   (b) monitoring utilization of forward link air interface resources; and
   (c) dynamically adjusting the forward link air interface resources allocated to the broadcast stream responsive to changes in the utilization of forward link air interface resources; and
   (d) scaling the quality of the broadcast stream responsive to adjustments to the allocated forward link air interface resources;
   wherein the content provider is an originating mobile station transmitting the broadcast stream over a reverse link channel to the wireless communication network.

4. The method of claim 3 further comprising determining a capacity of the reverse link broadcast channel, and scaling the quality of the broadcast stream for transmission over the reverse link channel.

5. The method of claim 4 further comprising limiting forward link air interface resources dedicated to the broadcast stream based on the quality of the broadcast stream transmitted over the reverse link channel.

6. The method of claim 4 further comprising limiting reverse link air interface resources dedicated to the broadcast stream based on the quality of the broadcast stream transmitted over the forward link broadcast channel.

7. A system for providing broadcast services in a mobile wireless communication network, comprising:
- a resource manager to monitor utilization of forward link air interface resources and to dynamically adjust the forward link air interface resources allocated to a broadcast stream responsive to changes in the utilization of forward link air interface resources; and
- a stream manager to scale the quality of the broadcast stream responsive to adjustments to the allocated forward link air interface resources;
- wherein the resource manager transmits broadcast service parameters to the mobile stations to indicate the forward link air interface resources dedicated to the broadcast stream and wherein the broadcast service parameters indicate the scaling applied to the broadcast stream transmitted over the air interface.

8. The system of claim 7 wherein the broadcast service parameters transmitted to the mobile stations include a mode identifier that identifies a set of broadcast service parameters for the broadcast stream.

9. A system for providing broadcast services in a mobile wireless communication network, comprising:
- a resource manager to monitor utilization of forward link air interface resources and to dynamically adjust the forward link air interface resources allocated to a broadcast stream responsive to changes in the utilization of forward link air interface resources; and
- a stream manager to scale the quality of the broadcast stream responsive to adjustments to the allocated forward link air interface resources;
- wherein the broadcast stream originates at a mobile station transmitting the broadcast stream over a reverse link channel to the wireless communication network.

10. The system of claim 9 wherein the resource manager limits forward link air interface resources dedicated to the broadcast stream based on the quality of the broadcast stream transmitted over the reverse link channel form the originating mobile station.

11. The system of claim 9 wherein the resource manager sends information comprising limiting reverse link air interface resources dedicated to the broadcast stream based on the scaling used for transmission over the forward link broadcast channel.

* * * * *

UNITED STATES PATENT AND TRADEMARK OFFICE
CERTIFICATE OF CORRECTION

| | | |
|---|---|---|
| PATENT NO. | : 7,400,889 B2 | Page 1 of 1 |
| APPLICATION NO. | : 10/814098 | |
| DATED | : July 15, 2008 | |
| INVENTOR(S) | : Balasubramanian et al. | |

It is certified that error appears in the above-identified patent and that said Letters Patent is hereby corrected as shown below:

On the Title Pg, Item (73), under "Assignee", Line 2, after "(publ)" insert -- , Stockholm --.

In Fig. 1, Sheet 1 of 4, in Box "20", Line 1, delete "CODE NETWORK" and insert -- CORE NETWORK --, therefor.

In Fig. 1, Sheet 1 of 4, in Box "28", Line 3, delete "28" and insert -- 23 --, therefor.

In Fig. 2, Sheet 2 of 4, in Box "20", Line 2, delete "20" and insert -- 30 --, therefor at each occurrence.

In Fig. 2, Sheet 2 of 4, in Box "30", Line 2, delete "30" and insert -- 20 --, therefor.

In Column 3, Line 11, delete "32 a" and insert -- 34 --, therefor.

In Column 5, Line 8, delete "BCMS" and insert -- BCMCS --, therefor.

Signed and Sealed this

Twenty-second Day of December, 2009

David J. Kappos
*Director of the United States Patent and Trademark Office*